US010750733B1

(12) United States Patent
Garner

(10) Patent No.: US 10,750,733 B1
(45) Date of Patent: Aug. 25, 2020

(54) AUTONOMOUS INSECT CARRIER

(71) Applicant: Espen Garner, Irvine, CA (US)

(72) Inventor: Espen Garner, Irvine, CA (US)

(*) Notice: Subject to any disclaimer, the term of this patent is extended or adjusted under 35 U.S.C. 154(b) by 0 days.

(21) Appl. No.: 16/530,503

(22) Filed: Aug. 2, 2019

Related U.S. Application Data

(63) Continuation-in-part of application No. 15/908,515, filed on Feb. 28, 2018, now abandoned.

(51) Int. Cl.
*A01M 5/02* (2006.01)
*B64D 47/08* (2006.01)

(52) U.S. Cl.
CPC ............. *A01M 5/02* (2013.01); *B64D 47/08* (2013.01); *A01M 2200/012* (2013.01); *B64C 2201/024* (2013.01); *B64C 2201/042* (2013.01); *B64C 2201/108* (2013.01); *B64C 2201/12* (2013.01); *B64C 2201/145* (2013.01); *B64C 2201/146* (2013.01)

(58) Field of Classification Search
CPC .................................. A01M 1/04; A01M 5/04
See application file for complete search history.

(56) References Cited

U.S. PATENT DOCUMENTS

| 3,468,289 | A | * | 9/1969 | Broida ................. B65D 81/266 119/6.5 |
| 4,121,372 | A | | 10/1978 | Landaus |
| 4,212,129 | A | | 7/1980 | Shumate |
| 4,611,425 | A | | 9/1986 | Dickerson |
| 4,785,573 | A | | 11/1988 | Millard |
| 4,852,296 | A | | 8/1989 | Swanson et al. |
| 4,908,979 | A | | 3/1990 | Hostetter |
| 5,301,458 | A | | 4/1994 | DeYoreo et al. |
| 7,658,346 | B2 | | 2/2010 | Goossen |
| 8,408,164 | B2 | * | 4/2013 | Robinson, Jr. ....... A01K 67/033 119/174 |
| 9,693,547 | B1 | | 7/2017 | Moitier |
| 9,807,996 | B1 | | 11/2017 | Yu |
| 9,856,020 | B1 | | 1/2018 | Gordon et al. |
| 9,999,213 | B2 | | 6/2018 | Yu |
| 10,021,869 | B1 | | 7/2018 | Cogley |
| 10,026,165 | B1 | | 7/2018 | Fryshman |
| 10,081,426 | B2 | | 9/2018 | Gordon et al. |

(Continued)

FOREIGN PATENT DOCUMENTS

| IN | 3013DEL2015 A | 3/2017 |
| WO | 2017154004 A1 | 9/2017 |

(Continued)

OTHER PUBLICATIONS

Office Action for U.S. Appl. No. 15/908,515 dated Aug. 28, 2019; 15 pgs.

*Primary Examiner* — Magdalena Topolski
*Assistant Examiner* — Morgan T Barlow
(74) *Attorney, Agent, or Firm* — Umberg Zipser LLP

(57) ABSTRACT

Unmanned autonomous vehicles UAV (e.g., drones) are described that include an insect carrier for transporting and/or capturing mosquitoes or other insects and/or their larvae. The insect carrier may include a programmable opening for delivering the insects/larvae to a select location and/or capture the insects from the select location. Target locations include underground sewers, and the UAV includes sonar sensors to assess spatial surroundings and adjust positioning to avoid any collisions.

10 Claims, 12 Drawing Sheets

(56) References Cited

U.S. PATENT DOCUMENTS

| | | |
|---|---|---|
| 2005/0060926 A1 | 3/2005 | Lee et al. |
| 2005/0126068 A1 | 6/2005 | Welch |
| 2006/0053683 A1 | 3/2006 | Lau |
| 2008/0010896 A1 | 1/2008 | Lin |
| 2010/0044156 A1* | 2/2010 | Tkebuchava ............ B64D 1/22 182/231 |
| 2010/0071255 A1 | 3/2010 | Zilbershlag |
| 2013/0326933 A1 | 12/2013 | Jung |
| 2014/0165452 A1 | 6/2014 | Rocha |
| 2014/0223802 A1 | 8/2014 | Barrera et al. |
| 2014/0268679 A1 | 9/2014 | Huang |
| 2014/0311015 A1 | 10/2014 | Oehlschlager |
| 2015/0160658 A1* | 6/2015 | Reedman ................ G05D 1/102 701/3 |
| 2016/0050840 A1* | 2/2016 | Sauder ................ G05D 1/0094 701/3 |
| 2017/0031365 A1 | 2/2017 | Sugumaran et al. |
| 2017/0139409 A1* | 5/2017 | Clarke ................ B64C 39/024 |
| 2017/0253329 A1 | 9/2017 | Champagne et al. |
| 2017/0253330 A1 | 9/2017 | Saigh et al. |
| 2018/0077918 A1 | 3/2018 | Yu |
| 2018/0125052 A1 | 5/2018 | Johnson |
| 2018/0206465 A1 | 7/2018 | Massaro et al. |
| 2018/0244404 A1* | 8/2018 | Park ........................ B64F 1/007 |
| 2018/0271080 A1 | 9/2018 | Kim et al. |
| 2018/0343846 A1 | 12/2018 | Horne |
| 2019/0082650 A1 | 3/2019 | Lepek et al. |
| 2019/0090469 A1 | 3/2019 | Hockaday |
| 2019/0090471 A1 | 3/2019 | Maguire et al. |
| 2019/0092471 A1 | 3/2019 | Lepek et al. |
| 2019/0113219 A1 | 4/2019 | Niemiec et al. |
| 2019/0133105 A1 | 5/2019 | Leach et al. |
| 2019/0248491 A1 | 8/2019 | Champagne, Jr. et al. |
| 2019/0250640 A1 | 8/2019 | O'Flaherty et al. |

FOREIGN PATENT DOCUMENTS

| | | |
|---|---|---|
| WO | 2018182944 A1 | 10/2018 |
| WO | 2019007494 A1 | 1/2019 |
| WO | 2019094991 A1 | 5/2019 |

\* cited by examiner

AUTONOMOUS INSECT CARRIER

CROSS-REFERENCE TO RELATED APPLICATION(S)

The present application is a continuation-in-part of U.S. application Ser. No. 15/908,515 entitled "Unmanned Aerial Vehicle Having an Insect Trap," filed on Feb. 28, 2018, the entire contents of which is incorporated herein by reference.

FIELD OF THE INVENTION

The field of the invention is mobile and autonomous insect carriers.

BACKGROUND

The following description includes information that may be useful in understanding the present invention. It is not an admission that any of the information provided herein is prior art or relevant to the presently claimed invention, or that any publication specifically or implicitly referenced is prior art.

No one is exempt from the bite of a mosquito, and if that mosquito carries a disease, then the insect will pass along the disease and infect a person. The cycle starts with mosquitoes ingesting microorganisms while feeding on an infected person or animal. Later, the pathogens are transmitted into a different person or animal when the female mosquito uses its proboscis to inject saliva before sucking blood from its next victim. Mosquitoes are vectors, or carriers, of many deadly diseases, including Malaria, Dengue and Yellow Fever, West Nile Virus, Chickungunya and Zika virus.

In the past, Zika virus became a widespread epidemic, infecting approximately 3-4 million people and resulting in microcephaly and other central nervous system malformations in its victims' offspring. This mosquito-dependent virus impacted the Olympic Games in Brazil as pregnant women were unable to attend due to the risk of infection. As recently as November 2017, Texas experienced its first case of Zika virus infection spread by local mosquitoes.

Unfortunately, mosquito populations are difficult to test, as they are often in remote locations or in confined spaces. This increases the difficult in trapping the mosquitoes due to the terrain, location, and spatial restrictions. Traditional traps require physical placement and close monitoring, which can be difficult in less populated and/or confined areas.

The testing of mosquitoes for viruses has become important for one main reason: viruses carrying mosquitoes have become common in our world, sickening hundreds of millions of people annually and killing several million people each year. Currently, the U.S. faces difficulty in efficiently catching the insects responsible for the spread of such viruses. In Orange County, California alone, there are 24 species of mosquitoes, a handful of which transmit disease. Two new invasive mosquitoes to the Orange County area include the Asian tiger (*Aedes albopticus*) which transmits Zika and Dengue and Yellow Fever, and *Aedes aegypti* which mainly transmits Yellow Fever, but can also transmit Zika. Two other dangerous mosquito species are *Culex*, which transmits West Nile Virus, and *Anopheles*, which carries the parasite that transmits malaria. With an improved ability to trap mosquitoes for testing, the U.S. would be better able to alert the public of new risky mosquito populations and mosquitoes that might be carrying viruses before they arrive into the local area or before there is a major health threat. This early detection is critical to prevent mosquitoes from spreading viruses.

Specific to the Los Angeles, Calif. area, there is reportedly about 1,500 miles of storm drains underground through which approximately 100 million gallons of water passes through each day. These enclosed waterways harbor many mosquito populations.

Some companies have begun to develop prototypes to locate and trap mosquitoes using unmanned aerial vehicles (UAVs), commonly referred to as drones. For example, Microsoft has created a UAV to identify areas where mosquitoes may be present, and where a physical trap could be placed. However, this trap is not mobile, and therefore, it is only useful for identifying a specific sampling location.

More recent gene editing technologies have enabled the breeding of all male sterile progeny, genetically modified mosquitoes/larvae that are not capable of breeding live progeny or are capable of passing on disease-fighting (e.g., anti-malaria) genes to its progeny. Notably, these genetically modified mosquitoes must be distributed to the relevant mosquito populations. Accordingly, there is a need for a cost-effective carrier for disseminating and/or trapping insects such as mosquitoes to select locations, and, to and from locations in underground waterways and sewers.

All publications identified herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

SUMMARY OF THE INVENTION

Aspects of embodiments of unmanned autonomous vehicles UAV (e.g., drones) are described herein that include an insect carrier for selectively transporting and/or capturing mosquitoes or other insects. The insect carrier may include a controllable opening configuration that when actuated, creates an opening in the insect carrier allowing insects to be delivered (e.g., disseminated or released) to a select location and/or captured (e.g., trapped) from a select location. To distribute or collect insects in target locations including underground sewers, the UAV includes sonar sensors to assess spatial surroundings and adjust positioning to avoid any collisions.

Aspects of the inventive subject matter include an unmanned, rotary wing drone (UAV) having an insect carrier, with the drone comprising at least a body, a flight controller, a plurality of sonar sensors, and an insect carrier. The body of the drone includes one or more propulsion units, each of which include a motor and a propeller, wherein the one or more propulsion units are configured to provide sufficient lift when operating to allow the drone to fly. The flight controller is disposed on the body of the drone and the flight controller includes (1) a transmitter/receiver for transmission to and receipt of data from a remote source, and (2) a memory having a capacity to store at least one flight plan, wherein the flight controller is configured to semi-autonomously or autonomously control the one or more propulsion units and fly the drone from a first drone position to a second drone position. The plurality of sonar sensors are positioned on the drone to receive spatial positioning data of the drone. The insect carrier is coupled to the body of the drone. The insect carrier has a hollow shape in contact with the body having a cavity therein. The insect carrier includes a portal component in contact with the hollow shape wherein the hollow shape has a closed state and an open state each of which is formed by a corresponding closed position and a corresponding open position of the portal component. The insect carrier also includes a portal motor for actuating for actuating the portal component from the closed position to the open position and vice versa, wherein the open state of the hollow shape forms one or more passages between inside the insect carrier and outside the insect carrier.

Further aspects of the contemplated drone include the portal component being in the closed position by occlusion of one or more openings in the hollow shape. In more typical aspects, the contemplated drone includes a first portal member and a second portal member, wherein the first portal member is a section of the hollow shape having one or more openings and the second portal member occludes the one or more openings when the portal component is in the closed position.

Additionally, in preferred aspects, the contemplated drone includes a portal component having a first portal member and a second portal member, wherein the first portal member is a section of the hollow shape having a first set of one or more openings and the second portal member includes a second set of one or more openings, wherein the closed position comprises the second set of one or more openings being offset from the first set of one or more openings to occlude all of the one or more openings resulting in the hollow shape being in the closed state, and the open position of the portal component includes the second set of one or more openings being aligned with at least some of the first set of one or more openings resulting in the hollow shape being in the open state. In some additional embodiments, the first set of one or more openings and the second set of one or more openings each comprise the same number and shape of openings. In more typical embodiments, the second portal member is positioned inside the hollow shape of the insect carrier and the second set of one or more openings each have at least the same area or diameter as the first set of one or more openings.

The inventor of the presently disclosed drone further contemplates the portal motor being a servomechanism.

In additional aspects of the inventive subject matter, the contemplated insect carrier of the drone includes titanium dioxide ($TiO_2$) powder disposed within the cavity of the insect carrier to attract and/or retain mosquitoes into the insect carrier. The $TiO_2$ powder may be enclosed in a mesh enclosure (e.g., a small mesh bag which may approximate or may be a tea bag).

With respect to general features, the contemplated drone may include at least one battery coupled to the body. At least one battery preferably includes a storage capacity of between 4,000 to 6,000 mAh (milliampere-hours). The drone may also include a solar panel configured to provide power to the battery or batteries. In some embodiments, at least one battery on the drone is configured to power the flight controller and the one or more propulsion units.

In other general aspects, the body of the contemplated drone includes a carbon fiber frame. The drone may also include a visual and/or infrared camera, a global position system (GPS) beacon, and/or a light beacon.

Additional aspects of the inventive subject matter include the flight controller being configured for semi-autonomous control including at least one camera for first person view (FPV) by a remote operator. Aspects of the contemplated drone for autonomous control include a pre-programmed map of a selected route with a corresponding flight plan from the first drone position to the second drone position.

In a preferred embodiment, the contemplated drone and its functioning parts are protected to at least be water resistant, and in more preferred embodiments are protected to be waterproof.

In a specific example, the contemplated unmanned, rotary wing drone having an insect carrier includes a body, a flight controller, a plurality of sonar sensors, and an insect carrier having titanium dioxide ($TiO_2$) and a vent through which air can flow while containing one or more insects. For this exemplary drone, the body has one or more propulsion units, each of which include a motor and a propeller, wherein the one or more propulsion units are configured to provide sufficient lift when operating to allow the drone to fly. The flight controller of this drone is disposed on the body that comprises (1) a transmitter/receiver for transmission to and receipt of data from a remote source, and (2) a memory configured to store at least one flight plan, wherein the flight controller is configured to semi-autonomously or autonomously control the one or more propulsion units and fly the drone from a first drone position to a second drone position. The plurality of sonar sensors on this drone receive spatial positioning data of the drone relative to its surroundings. Also, the insect carrier of this drone is coupled to the body of the drone, wherein the insect carrier includes a hollow shape, a portal component, and a portal motor. More specifically, the hollow shape is in contact with the body of the drone and has a cavity. The portal component is in contact with the hollow shape and has a closed state and an open state formed by a corresponding closed position and a corresponding open position of the portal component. The portal component also includes an outer set of one or more openings positioned in the hollow shape and an inner cassette positioned within the hollow shape, the inner cassette including: (i) an inner set of one or more openings having the same number, shape, and at least the same area as the outer set of one or more openings, and (ii) a servomechanism capable of actuating a rotation of the inner cassette about a center axis to align the inner set of one or more openings with the outer set of openings to provide one or more passages from the cavity inside the hollow shape to outside the insect carrier.

Various objects, features, aspects and advantages of the inventive subject matter will become more apparent from the following detailed description of preferred embodiments, along with the accompanying drawing figures in which like numerals represent like components.

DETAILED DESCRIPTION

Figure 1:
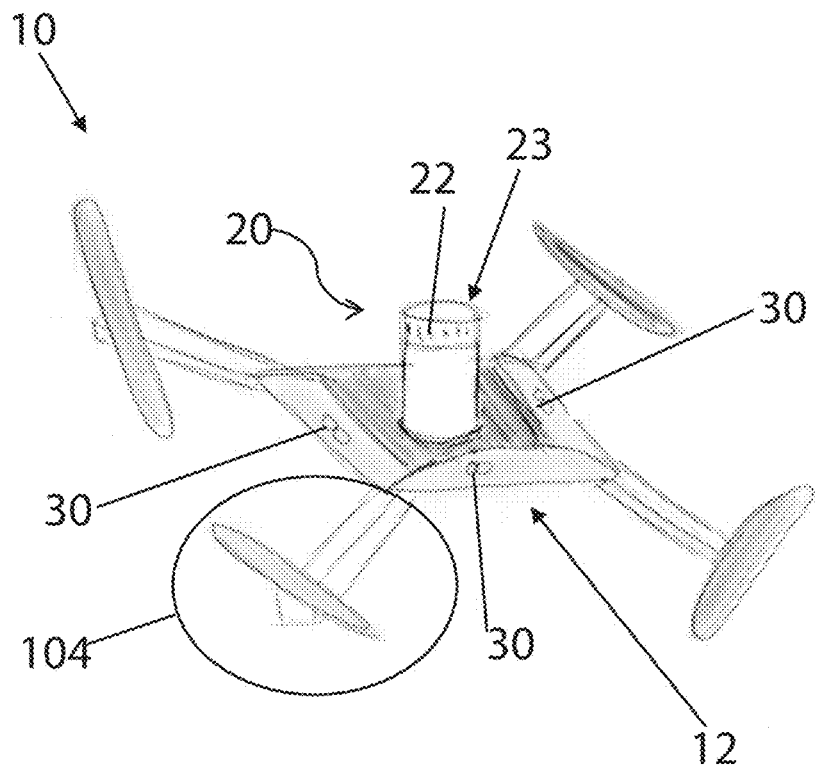
FIG. 1 is a schematic of one embodiment of the UAV having an insect carrier with conditional openings for controlled release and/or trapping of insects.

The following discussion provides many example embodiments of the inventive subject matter. Although each embodiment represents a single combination of inventive elements, the inventive subject matter is considered to include all possible combinations of the disclosed elements. Thus, if one embodiment comprises elements A, B, and C, and a second embodiment comprises elements B and D, then the inventive subject matter is also considered to include other remaining combinations of A, B, C, or D, even if not explicitly disclosed.

The inventive subject matter provides apparatus, systems, and methods in which a lightweight, unmanned aerial vehicle (UAV) includes an insect carrier configured to carry and controllably distribute mosquitoes or other insects and/or the insect carrier is configured to attract and trap mosquitoes or other insects. The UAV is preferably autonomously flown according to a stored flight plan, such that the UAV can take off from a first (initial or starting) position, fly to a second position (e.g., a selected or target position), land, and then take off and return to the first position. The UAV may include sonar sensors for determining the spatial environment surrounding the UAV in real time to allow for effective navigation through enclosed spaces such as underground sewers. The UAV can include a power source sufficient to permit flight to the second position. The UAV may also include solar panels to recharge the power source to permit the UAV to take the return flight to the first position. The outer covering and components of the UAV may be made of waterproof material to maintain function of the UAV in wet environments such as underground sewers. Additionally, the insect carrier may include titanium oxide ($TiO_2$) powder as an attractant for luring mosquitoes into the insect carrier and/or retaining the mosquitoes in the insect carrier.

UAVs are aircraft with no pilot on board. UAVs are commonly referred to as drones and may be semi-autonomous or "fully" autonomous. A semi-autonomous UAV is remotely controlled (e.g., flown by a pilot at a ground control station) while an autonomous UAV can fly without a remote pilot based on pre-programmed flight plans of more complex dynamic automation systems. One type of UAV is a quadcopter which has two pairs of rotors (vertically oriented propellers). One pair of the rotors rotates clockwise, and the other rotates counterclockwise. Flight is controlled by the speed of each rotor.

Control and operation of an UAV may be one of several configurations depending on the desired or available sensing system for the UAV. The desired operational and sensing system for a UAV having an insect carrier may depend on the location restrictions where the insects are to be distributed and/or collected. The UAV or drone is typically flown with First Person View (FPV), which means a video camera is mounted on the UAV, broadcasting the live video to the pilot on the ground. This allows the pilot to fly the UAV as if onboard rather than look at the UAV from the pilot's actual ground position.

Use of the presently disclosed UAV for carrying genetically modified insects such as mosquitoes to a selected location and/or trapping sample insects (e.g., mosquitoes) from a selected location may be especially helpful for underground locations, including underground waterways and sewers. For transport of insects, the presently disclosed UAV includes an insect carrier having a controllable portal component allowing for one or more openings in the carrier to be closed during transport to the specific location, and then actuating the one or more openings to an open position thereby allowing any insects inside the carrier to fly out. As such the insect carrier has an open state and a close state in which the portal component which includes one or more openings which are occluded in the closed position and controllably opened in the open position allowing creating a passage between the inside of the hollow shape cavity and the outside. The portal component would be either remotely controlled by a remote operator or could be programmed to open upon reaching the target location by way of receipt of a signal from a beacon at the selected location. Similarly, an empty insect carrier for luring and collecting insects from a selected location may be closed or open during transport as determined by the operator. Upon transport to the selected location, the one or more openings in the portal component of the insect carrier may be opened (if they were closed), thereby allowing for any insects in the surroundings to enter into the insect carrier. Contemplated methods for attracting insects such as mosquitoes into the insect carrier are described in this disclosure. For example, an attractant for mosquitoes includes $TiO_2$ powder.

Figure 2A:
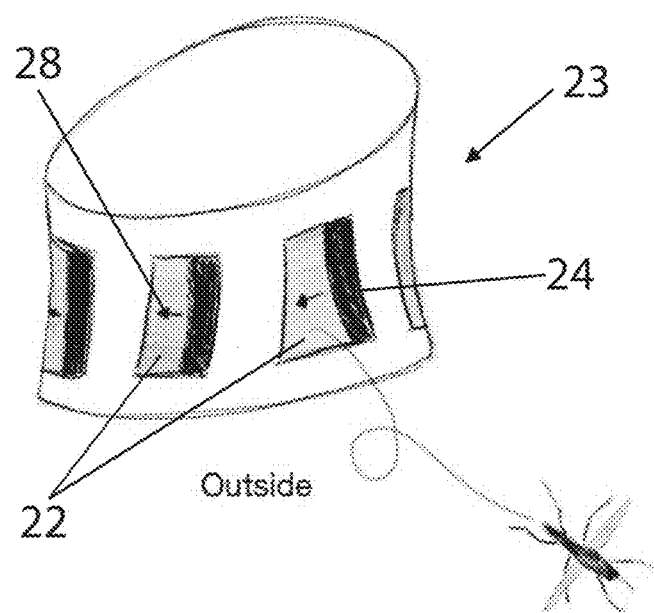
FIG. 2A is a schematic of one embodiment of a portal component of an insect carrier illustrating the closed and open states of the openings.
Figure 2B:
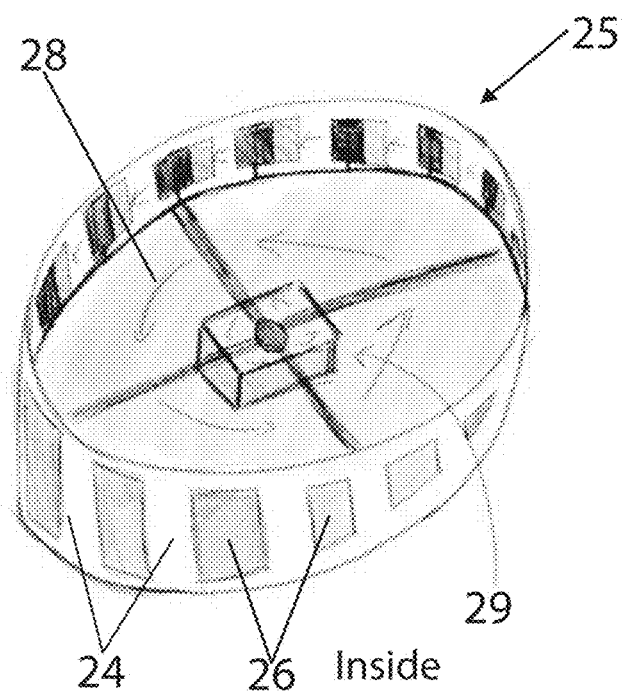
FIG. 2B is a schematic of one embodiment of a portal component of an insect carrier illustrating an inner portal component feature that enables the closed and open states of the openings in an outer portal component of the insect carrier.
Figure 3A:
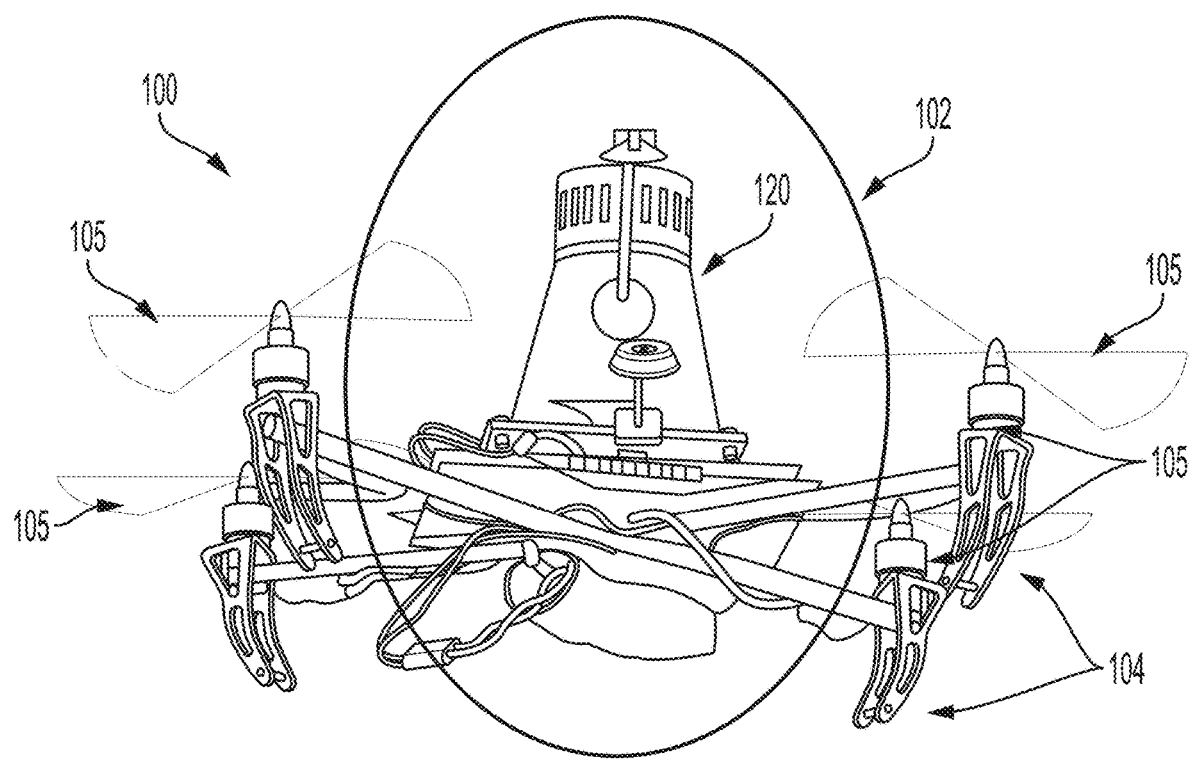
FIG. 3A illustrates a perspective view of one embodiment of the UAV in-flight.
Figure 3B:
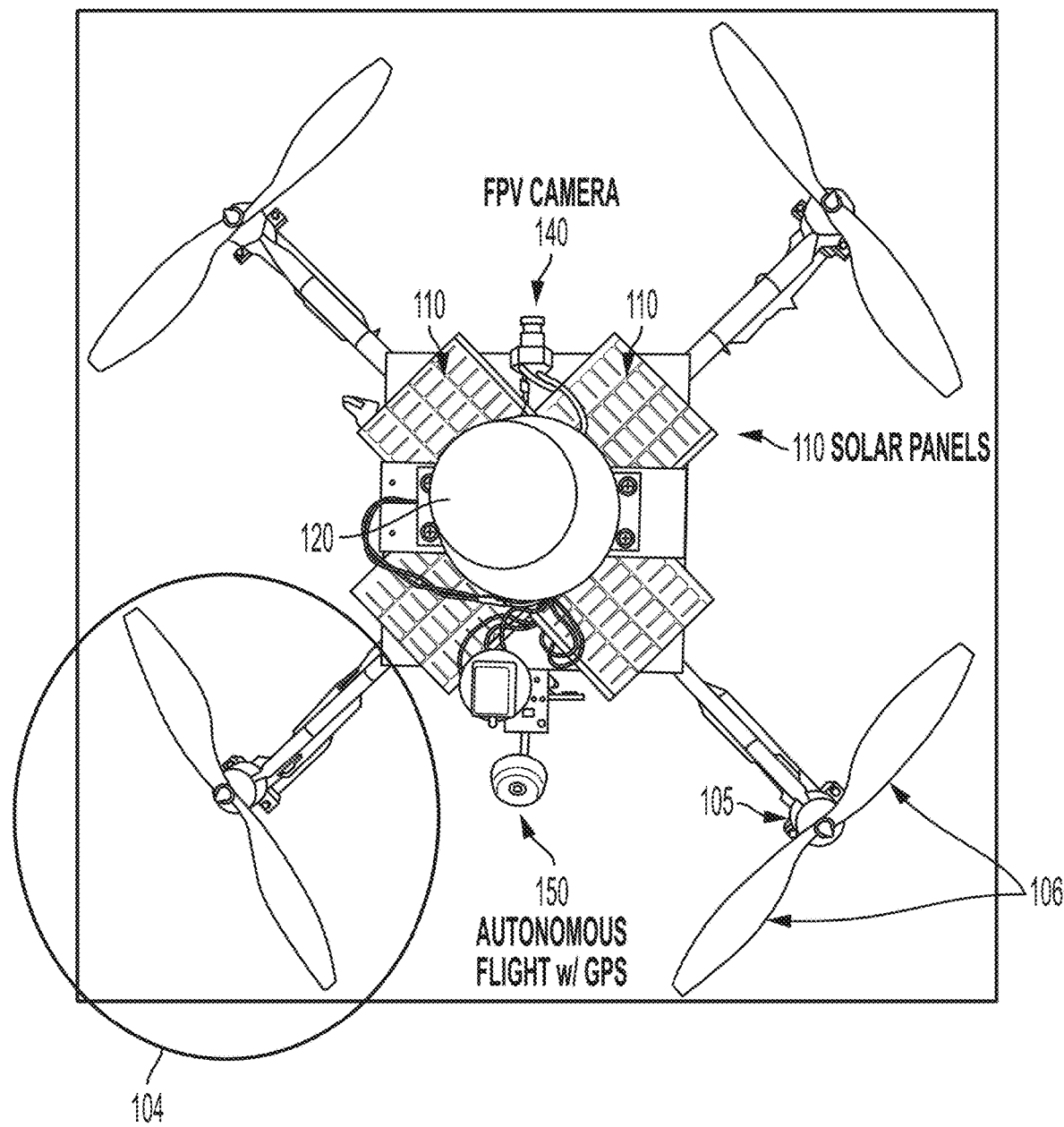
FIG. 3B illustrates a top view of the UAV of FIG. 3A.

With reference to FIG. 1, an example UAV 10 is depicted schematically having a body 12, an insect carrier 20 with openings 22, sonar sensors 30, and four propulsion units 104. With reference to FIGS. 2A and 2B, an example portal component 21 is depicted having a first member 23 and second member 25. The first member 23 may be a section of the insect carrier 20. In this example, the openings 22 in the first member 23 are on the outer surface of the insect carrier. The openings 22 are opened by an actuated movement 28 as shown in FIG. 2A. In the example shown in FIG. 2B, the second member 25 has openings 24 and the second member is configured to be positioned inside the hollow shape proximal to the first member 23 such that it is possible to align the openings 22 with the openings 24 thereby forming at least one passage opening from outside the insect carrier to inside the insect carrier.

In aspects of the contemplated insect carrier, actuation of the portal component by the portal motor controllably occludes the one or more openings in the insect carrier and controllably removes the occlusion from the one or more openings thereby creating an opening for the insects to fly out of and/or into the insect carrier to/from the surrounding. Preferably, the portal motor is a servomechanism capable of receiving an actuation signal or capable of being programmed to actuate the portal component upon arrival to one or more programmed locations.

In aspects of the contemplated drone having an insect carrier, the drone includes more than one sonar sensor 30 positioned on the drone. In typical embodiments, the drone includes four sonar sensors with one sonar sensor positioned between each of the four propulsion units 104. In more typical embodiments, the drone includes at least six sonar sensors with at least one positioned between each of the four propulsion units 104, at least one on top of the insect carrier (the top being the side of the body coupled to the insect carrier) and at least one sonar sensor on the bottom or underneath surface—the side of the body opposite the side of the insect carrier). Sonar sensors may be of any suitable type and configuration. For example, the sonar sensing may be reactive autonomy, such as collective flight, real-time collision avoidance, wall following and corridor centering. Advantageously, the contemplated UAV having an insect carrier and a configuration of a plurality of sonar sensors for wall following and corridor sensing allows for the UAV to navigate through underground tunnels including underground sewers.

The sonar sensors may be simple sensing systems or may be complex. The sonar sensing may rely on telecommunication and situational awareness and it may be coupled with radar including light radar. More complex systems may include ranger sensors which analyze electromagnetic radiation that is reflected off the environment and received by the sensor. This system may include a camera (for visual flow) which acts as simple receivers. Examples of more complex sensing systems include simultaneous localization and mapping (SLAM). SLAM combines odometry and external data to represent the position of the UAV in three dimensions relative to the regional surroundings and also possibly relative to the world.

In more preferred embodiments, the contemplated UAV having an insect carrier has an outer material or casing to protect the functionality of the operational components (e.g., transmitters, receivers, sonar sensors, cameras, etc.) of the UAV from water. Accordingly, the outer material or a casing of the body, including the operational components thereon, is made from a water-resistant and/or a waterproof material. Exemplary materials suitable for protecting the UAV and its components from condensation and/or falling or splashing water include any suitable thermoset or thermoplastic material. Examples include polyurethanes, polyesters, epoxy resins, phenolic resins, polyvinylchloride (PVC), polystyrene, polytetrafluoroethylene (Teflon), high density polyethylene (HDPE), polypropylene, and combinations thereof.

FIGS. 3A-3B and 4A-4B illustrate one embodiment of a rotary wing, unmanned aerial vehicle 100. The UAV 100 has a body 102 with four propulsion units 104, each comprising a variable-speed motor 105 coupled with a propeller 106. The motor 105 and propeller 106 are selected such that rotation of one or more of the propulsion units 104 provides sufficient lift to allow the body 102 and UAV 100 to fly. Preferably, the body 102 has a carbon fiber frame to reduce weight although other commercially suitable materials or combinations thereof could be used. Additionally, the body material or a casing around the body may be water-resistant or waterproof as disclosed herein.

Where four propulsion units 104 are used, it is preferred that two of the propulsion units are configured to rotate their respective propellers clockwise, with the other two propulsion units configured to rotate their respective propellers counter-clockwise, to thereby allow directional control of the drone by varying the rotational speed of the units.

UAV 10 or 100 further comprises a flight controller disposed on the body 12 or 102 and that comprises (1) a transmitter/receiver for transmission to and receipt of data from a remote source, and (2) a memory configured to store at least one flight plan. The flight controller is preferably configured to autonomously control the propulsion units 104 as a function of the stored flight plan and fly the UAV 100 from a first, initial position to a second position, all while remotely controlled or in autonomous operation.

The UAV 10 or 100 can optionally include a video camera 140 and a GPS unit 150. The video camera 140 can be used to provide a pilot with POV flight control when needed or desired, and in some cases, permit live or recorded view of the surroundings where the UAV 100 has landed. The GPS unit provides updated location information to at least one of the flight controllers and a remote pilot to determine the location of the UAV 10 or 100 and make any adjustments to the course as needed, for example.

A power source such as a battery is coupled to the body to provide power to the propulsion units 104, the flight controller, and other components on the UAV (UV light sources) that may require power. Preferably, the power source is selected such that the UAV 100 can take-off from a first position, fly a distance of at least one, or at least three, or at least five miles and then land at the second position according to a stored flight plan. Preferably, the power source has a storage capacity of between 4,000 to 6,000 mAh (milliampere hours), although smaller or larger capacities could be used so long as the UAV 100 can meet the above flight requirements. As configured, it is preferred that the UAV 10 or 100 will fly past its point of no return (with respect to the power source), such that the power source must be charged at the second position before the UAV 10 or 100 can return to the first position.

Figure 8:
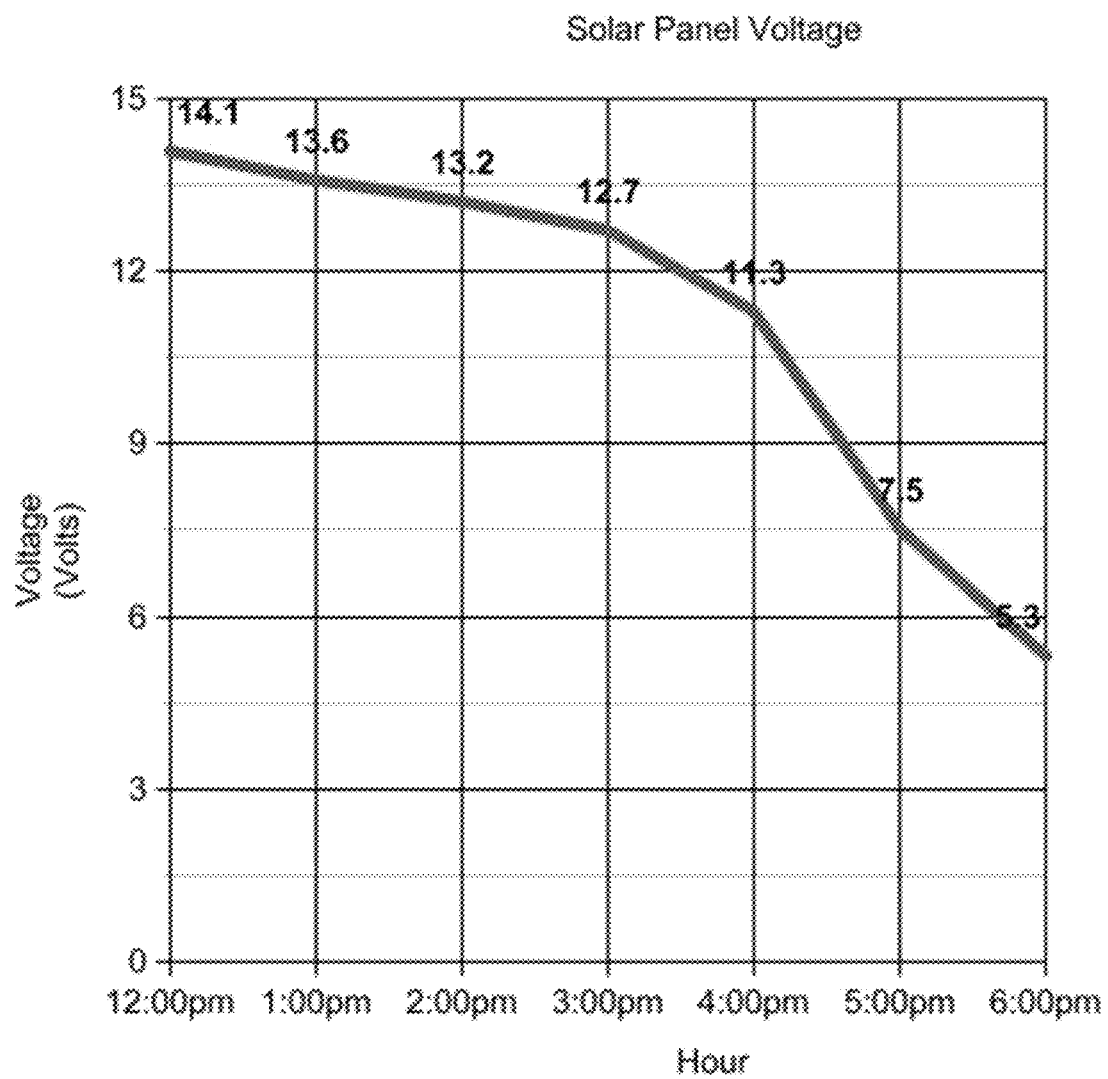
FIG. 8 is a chart of solar panel voltages as a function of time of day.

Because the UAV 10 or 100 is preferably configured to take off, travel to and land at a destination, and then take off from that destination and return back, all without swapping the power source or other physical interaction with the UAV 10 or 100, it is preferred that the UAV 10 or 100 has one or more photovoltaic panels 110 that can provide power to and thereby recharge the power source 10 or 100, while the UAV 10 or 100 is away. FIG. 8 illustrates voltage produced by the photovoltaic panels 110 during an afternoon, with the voltage expectedly decreasing in the later afternoon as compared with high noon.

Without the photovoltaic panels 110, the distance that can be traveled would be limited by the power source used. In addition, it is preferred that the photovoltaic panels 110 are sufficiently sized to permit recharge of the battery to permit the UAV 10 or 100 to take off and return to the first position from the second position.

The UAV 100 also has an insect carrier 120 coupled to the body 102. In the example depicted in FIGS. 4A-4B, the insect carrier 120 has an opening 122 that leads to a funnel 124 placed on a container 126. In some embodiments, the opening 122 comprises a grate sized and dimensioned to permit entry into the insect trap of the mosquito or other insect, although in other embodiments the opening could be one or more openings. As will be appreciated, the insect carrier may be fabricated in any suitable manner using various materials, including 3D printing of polymers (e.g., BPA/resin), machining of aluminum, etc.

The funnel 124 preferably has an opening at one end that allows only one-way movement of a mosquito or other insect into the container 126 via the funnel 124.

Figure 4A:
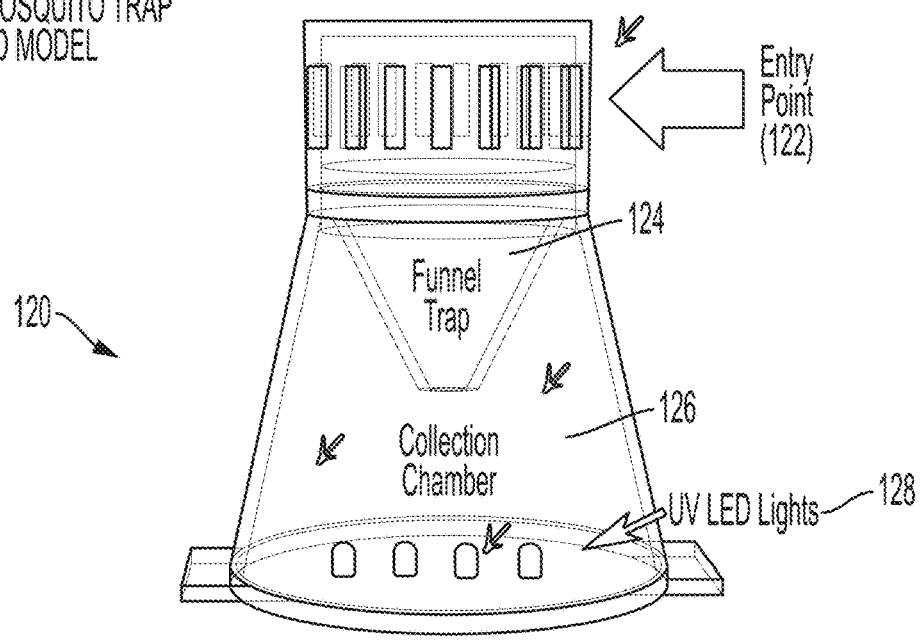
FIG. 4A illustrates one embodiment of an insect trap for use on a UAV.
Figure 4B:
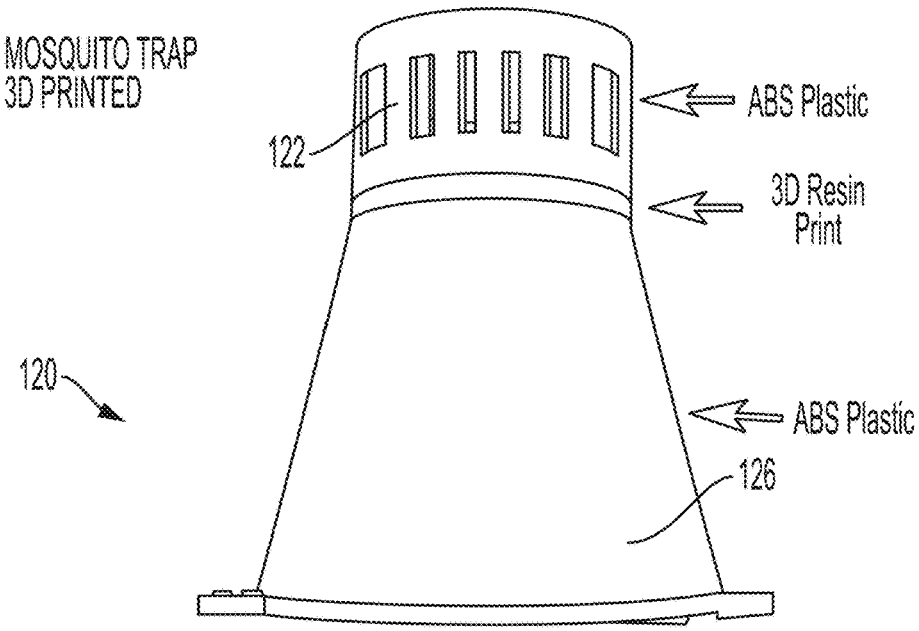
FIG. 4B illustrates one embodiment of an insect trap for use on a UAV.

With continued reference to FIGS. 4A-4B, to lure the mosquitoes into the container, the insect carrier 120, and specifically the container 126, preferably creates carbon dioxide ($CO_2$) on demand. Although prior art insect traps have utilized $CO_2$ cartridges or other inefficient means of producing $CO_2$, such traps were not suitable for use in a UAV due to high power requirements (e.g., the use of a fan), high weight (many components), and/or a need for manual replacement of cartridges. While working to address these issues, the inventor discovered that sufficient $CO_2$ to attract mosquitoes can be produced using at least one very low-power ultraviolet light sources 128, such as ultraviolet LEDs in the mW range when high-surface titanium dioxide ($TiO_2$) is used.

Figure 11:
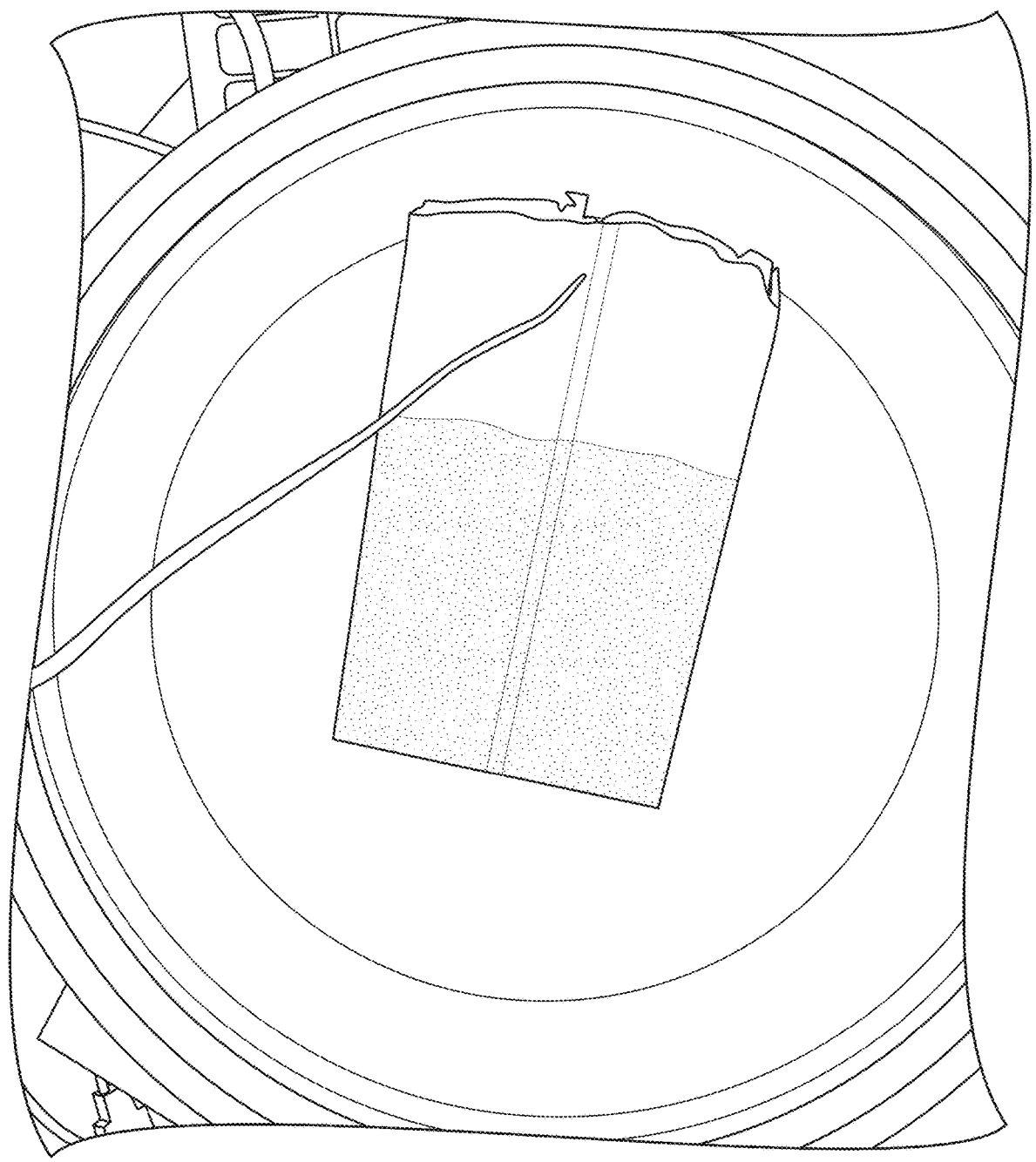
FIG. 11 is a photograph of one embodiment of a lure for an insect trap.

Ordinarily, high-surface material is loose powder of micron/nanosize particles, which would be blown off/away from a UAV during flight or with wind flow. Surprisingly, however, when high-surface $TiO_2$ powder was contained in a porous thin-walled mesh bag 130 (e.g., a tea bag), the porous nature of the bag 130 permitted sufficient ultraviolet light and ambient organic volatile molecules to interact with the $TiO_2$ to produce sufficient quantities of $CO_2$ to attract mosquitoes. An exemplary embodiment of a mesh bag 900 disposed within an insect carrier 902 is shown in FIG. 11.

Figure 5:
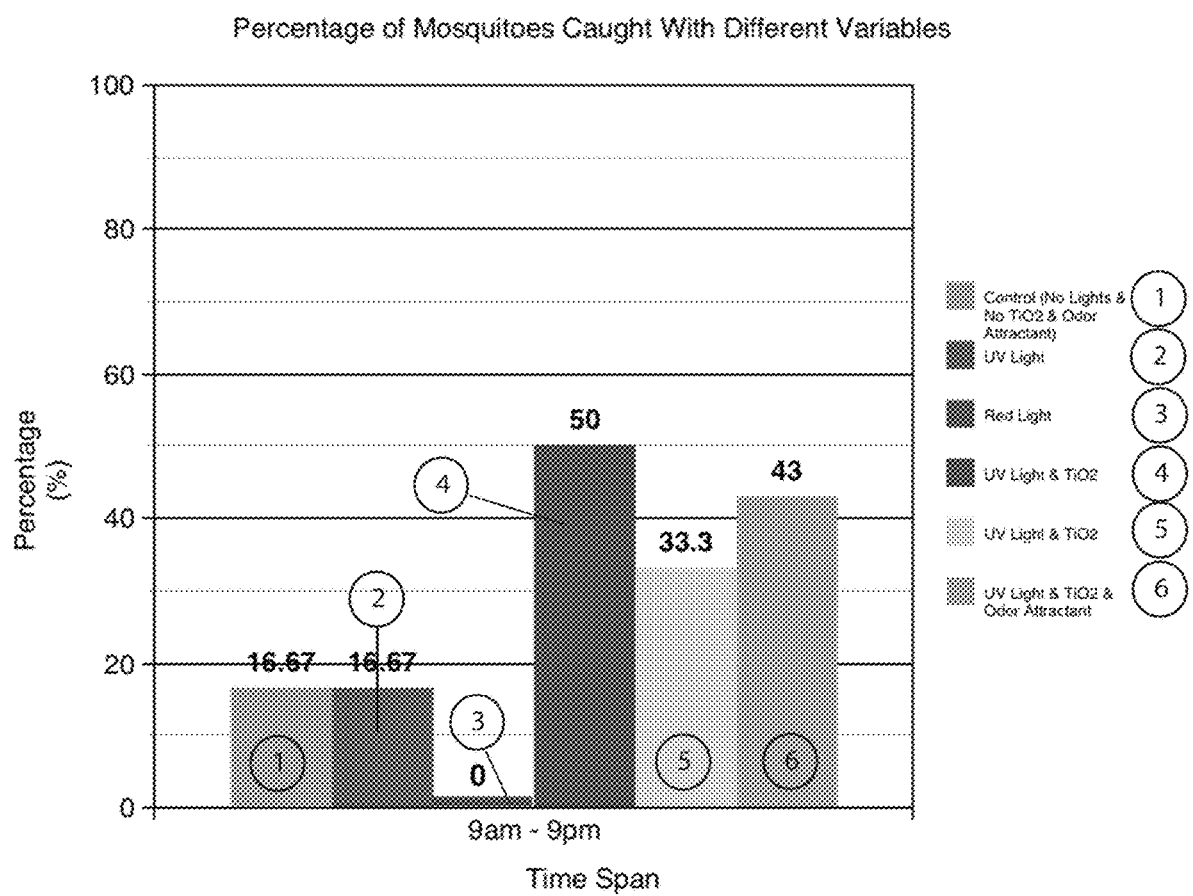
FIG. 5 is a chart showing the percentage of mosquitoes captured using different lures.

This was proven effective during various tests, in which different combinations of the use of low-power UV lights and $TiO_2$ were used. As shown in FIG. 5, the combination of low-power UV lights and $TiO_2$ far outperformed tests using (i) no UV light sources and no $TiO_2$, (ii) UV light sources but no $TiO_2$, and (iii) $TiO_2$ but no UV light sources.

It is contemplated that the UV light source(s) could be powered by the power source and/or the photovoltaic panels 110.

The inventor also tested for time of day to determine whether certain time periods were better for collecting mosquitoes. Based on the results from the limited testing shown in FIG. 6, early morning was found to be best to catch mosquitoes.

Figure 7:
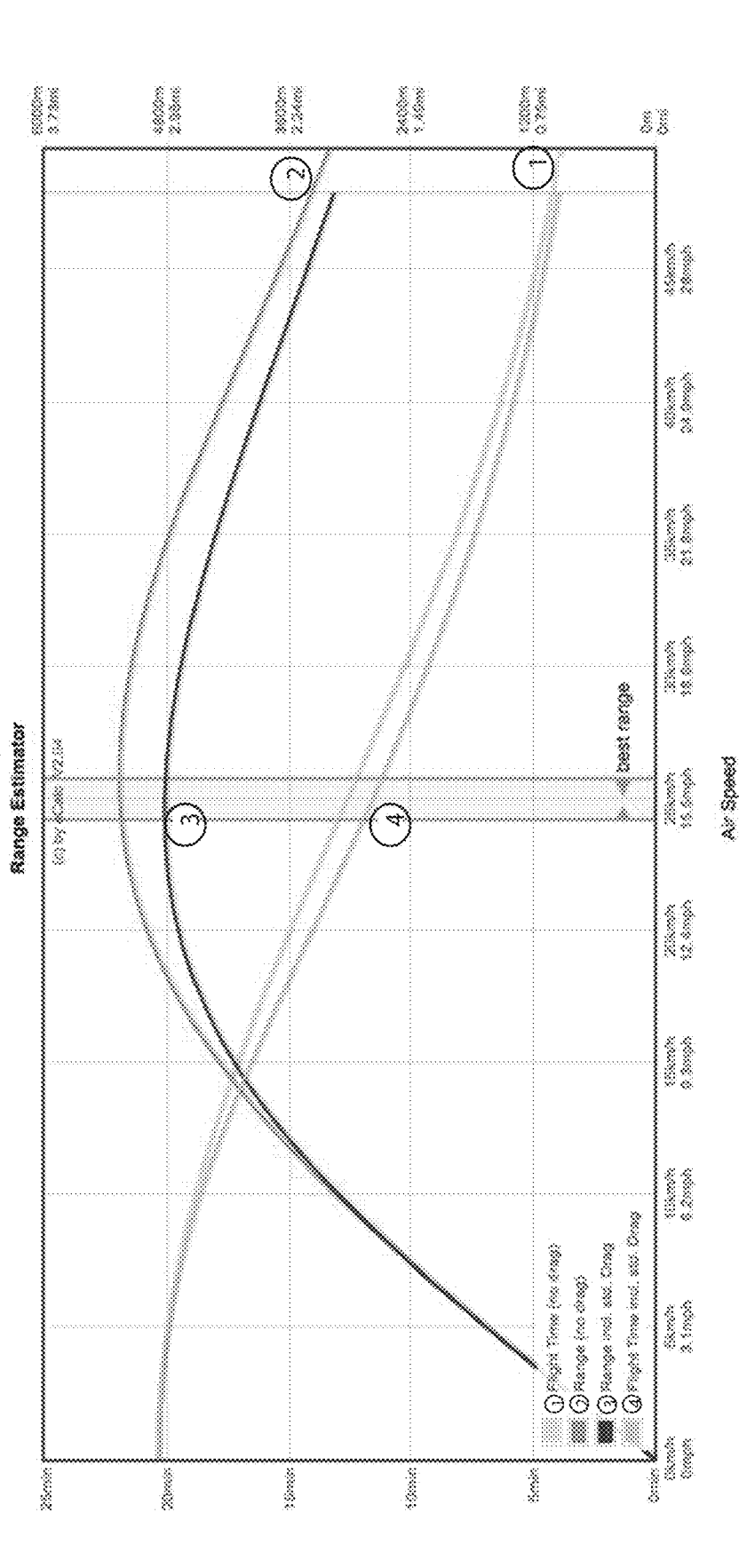
FIG. 7 is a chart of potential ranges of a UAV under varying conditions.

Using a range estimator with the results shown in FIG. 7, the inventor found that the UAV 100 as described above had the best range using an air speed of 25 km/h, although the specific air speed would depend on the final weight of the UAV, the power source, and other factors.

Figure 9:
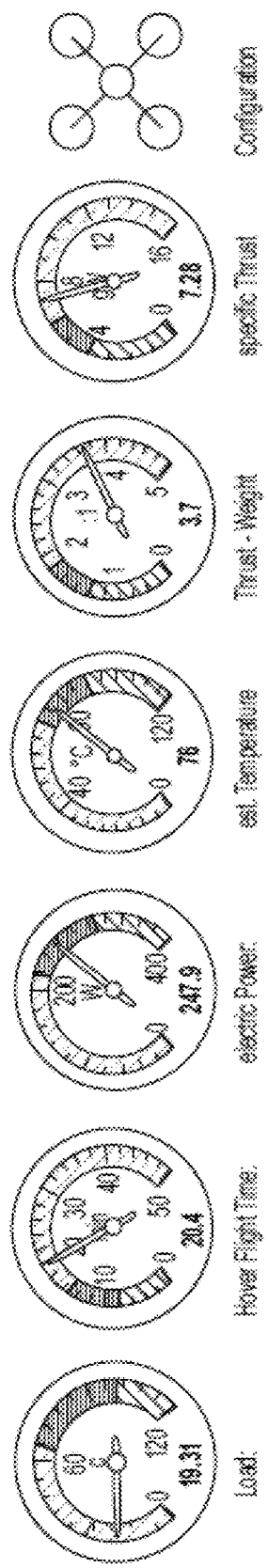
FIG. 9 presents various measurements from a flight of a UAV.
Figure 10:
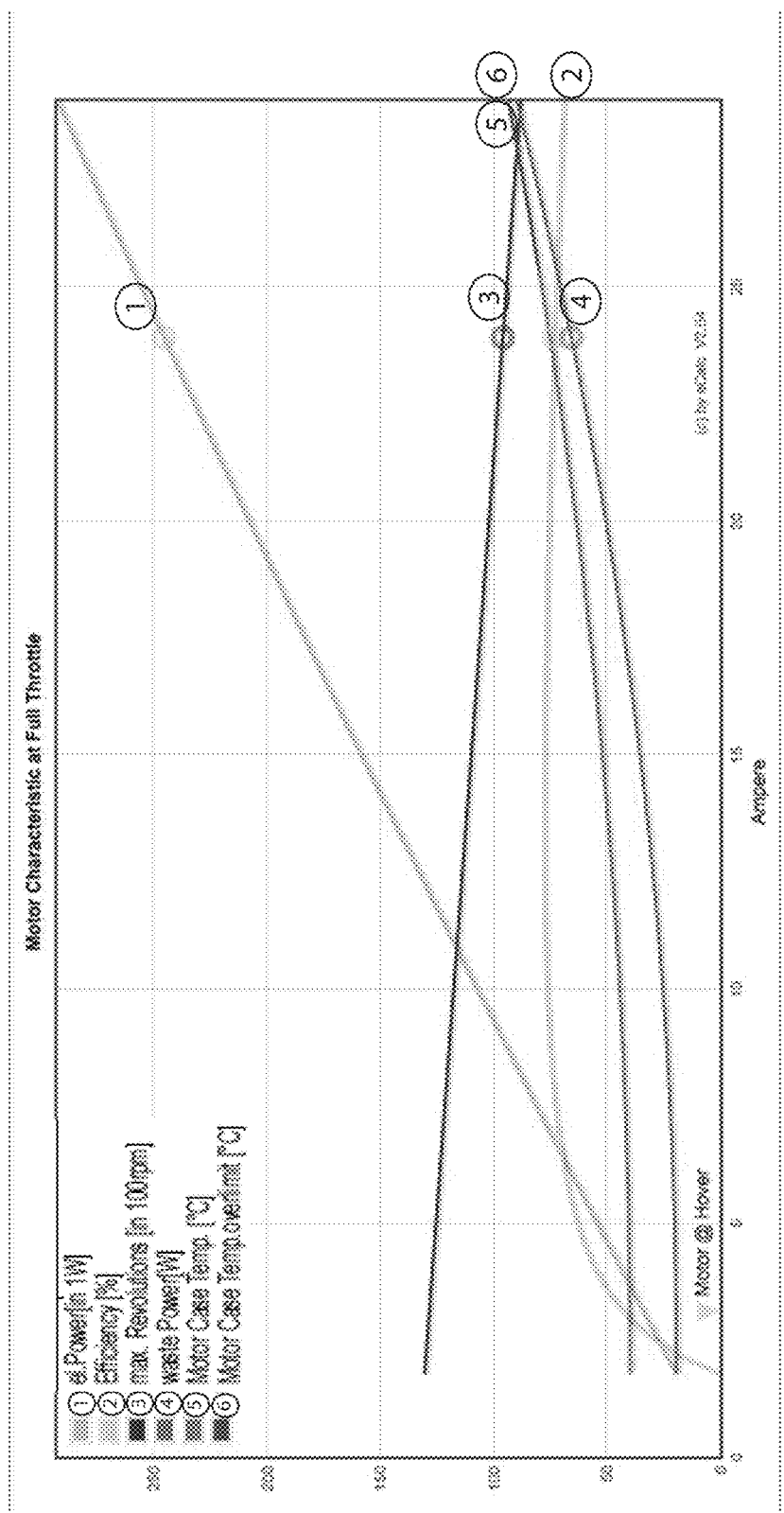
FIG. 10 is a chart of characteristics of the propulsion units at full throttle.

Various measurements from the UAV 100 during a flight are shown in FIG. 9. FIG. 10 presents characteristics of the propulsion units at full throttle.

Although the $TiO_2$ powder is preferably disposed within the container 126, it is contemplated that the $TiO_2$ powder could alternatively or additionally be disposed on the funnel 124.

Figure 6:
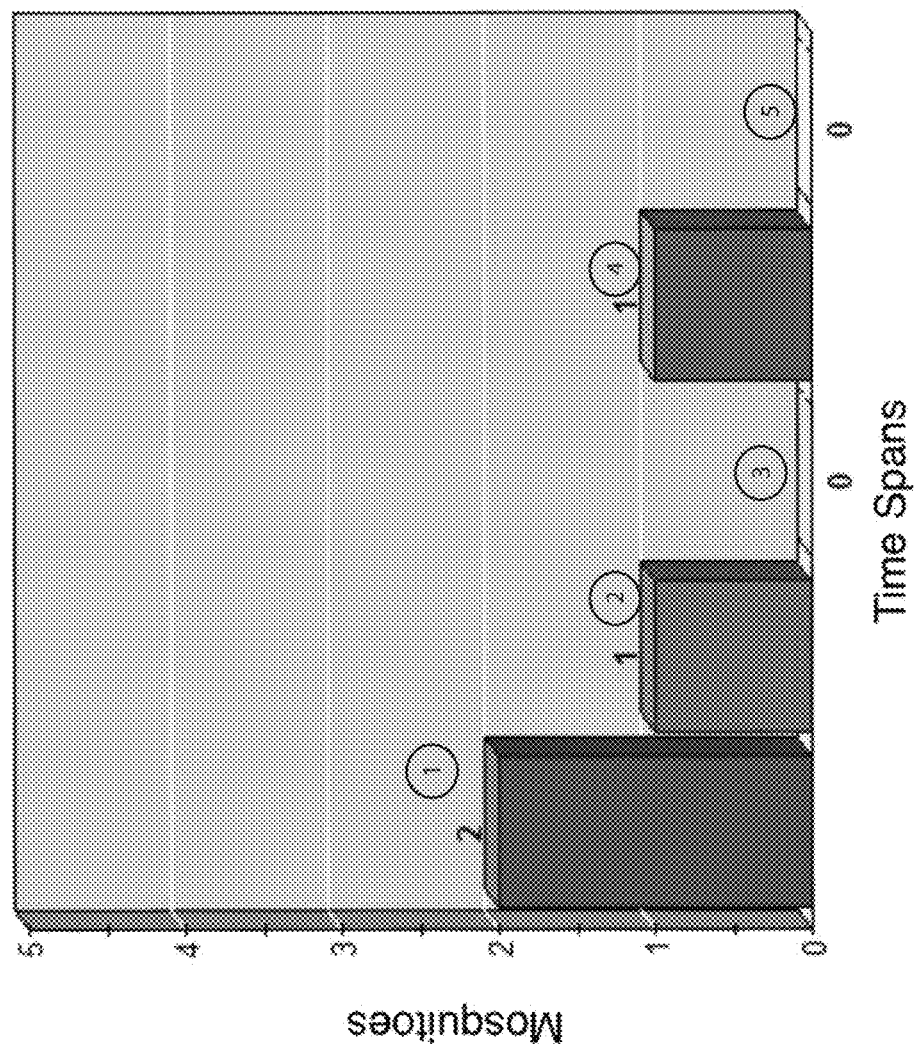
FIG. 6 is a chart showing a number of mosquitoes captured at different times of day.

As shown in FIG. 6, the low-power UV light sources 128 can be disposed within the insect carrier 120, and preferably below the funnel 124 and within the container 126. However, it is also contemplated that the UV light sources 128 could be disposed outside of the container 126, such as where at least a portion of the container is transparent or translucent to allow UV light to pass through the container's wall.

In testing, the UAV 100 was able to fly to distant locations and utilize its UV light sources to produce $CO_2$ from the $TiO_2$ powder. In initial testing, the UAV 100 was calculated to fly approximately 3 miles at a speed of about 15.5 mph.

Methods of using the presently disclosed UAV having an insect carrier include the transport and release genetically modified mosquitoes. The modified mosquitoes would then mate with native mosquitoes, and their progeny could be resistant to spreading disease due to the alteration in genetic material.

Taking the above challenges into consideration, the use of a lightweight UAV having an insect carrier provides an ideal solution for navigating the insect carrier into remote locations and confined spaces where it can release and/or capture insects such as mosquitoes. In addition, an economical UAV with insect carrier would also allow financially strapped government agencies to more readily access mosquitoes for testing.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

Unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value with a range is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification or claims refer to at least one of something selected from the group consisting of A, B, C . . . and N, the text should be interpreted as requiring only one element from the group, not A plus N, or B plus N, etc.

What is claimed is:

1. An unmanned, rotary wing drone having an insect carrier, the drone comprising:

a body having one or more propulsion units, each of which of the one or more propulsion units include a motor and a propeller, wherein the one or more propulsion units are configured to provide sufficient lift when operating to allow the drone to fly;

a flight controller disposed on the body that comprises (1) a transmitter/receiver for transmission to and receipt of data from a remote source, and (2) a memory configured to store at least one flight plan, wherein the flight controller is configured to semi-autonomously or autonomously control the one or more propulsion units and fly the drone from a first drone position to a second drone position;

a plurality of sonar sensors positioned on the drone to detect spatial positioning data of the drone; and an insect carrier coupled to the body, the insect carrier comprising:

a hollow shape in contact with the body, the hollow shape having a cavity for containing one or more insects or insect larvae, the hollow shape further comprising a mesh bag of titanium dioxide ($TiO_2$) powder posited in the cavity and a vent that allows air to flow into and out of the insect carrier while retaining the one or more insects in the cavity; and a portal component in contact with the hollow shape, wherein the hollow shape comprises a closed state and an open state formed by a corresponding closed position and a corresponding open position of the portal component, wherein the portal component comprises:

an outer set of one or more openings positioned in the hollow shape and an inner cassette positioned within the hollow shape, the inner cassette comprising: (i) an inner set of one or more openings having the same number, shape, and at least the same area as the outer set of one or more openings, and (ii) a servomechanism capable of actuating a rotation of the inner cassette about a center axis to align the inner set of one or more openings with the outer set of openings to provide one or more passages from the cavity inside the hollow shape to outside the insect carrier, wherein when the one or more passages are provided the hollow shape comprises the open state.

2. The drone of claim 1, wherein the drone further comprises at least one ultraviolet (UV) light source configured to emit UV light on the $TiO_2$ powder to produce carbon dioxide ($CO_2$).

3. The drone of claim 1, wherein the one or more propulsion units comprises at least four propulsion units and the plurality of sonar sensors include at least six sonar sensors positioned on the body.

4. The drone of claim 3, wherein each of four of the at least six sonar sensors is positioned in between two of the at least four propulsion units, one of the at least six sonar sensors is positioned on top of the body, and one of the at least six sonar sensor is positioned on the surface of the body opposite the insect carrier.

5. The drone of claim 1, wherein the body is made from or has an outer surface made from a water-resistant or waterproof material.

6. The drone of claim 5, wherein the water-resistant or waterproof material is selected from polyurethanes, polyesters, epoxy resins, phenolic resins, polyvinylchloride (PVC), polystyrene, polytetrafluoroethylene (Teflon), high density polyethylene (HDPE), polypropylene, or combinations thereof.

7. The drone of claim 1, wherein the insect is a mosquito.

8. The drone of claim 1, further comprising a visual or infrared camera, a GPS beacon, a light beacon.

9. The drone of claim 1, wherein the flight controller includes at least one camera for first person viewing (FPV) by a remote operator, and a corresponding flight plan from the first drone position to the second drone position.

10. A method of transporting one or more mosquitoes or one or more mosquito larvae to and/or from a first location to a second location using the unmanned, rotary wing drone of claim 1, wherein the second location is underground, the method comprising:

programming the flight controller to either (i) transport the one or more mosquitoes or the one or more mosquito larvae from the first location to the second location, or (ii) transport the insect carrier from the first location to the second location for providing a mosquito trap at the second location, wherein upon arrival of the drone to the second position, the programming further comprises:

actuating the rotation of the inner cassette about a center axis to align the inner set of one or more openings with the outer set of openings to provide the one or more passages from the cavity inside the hollow shape to outside the insect carrier to thereby allow for either (i) delivery of the one or more mosquitoes or the one or more mosquito larvae to the second location, or (ii) providing the mosquito trap to the second location.

* * * * *